(12) United States Patent
Wakita et al.

(10) Patent No.: US 8,252,460 B2
(45) Date of Patent: Aug. 28, 2012

(54) NON-AQUEOUS ELECTROLYTE BATTERY AND NEGATIVE ELECTRODE, AND METHOD FOR MANUFACTURING THE SAME

(75) Inventors: Shinya Wakita, Fukushima (JP); Izaya Okae, Fukushima (JP)

(73) Assignee: Sony Corporation, Tokyo (JP)

( * ) Notice: Subject to any disclaimer, the term of this patent is extended or adjusted under 35 U.S.C. 154(b) by 707 days.

(21) Appl. No.: 12/362,941

(22) Filed: Jan. 30, 2009

(65) Prior Publication Data

US 2009/0197179 A1 Aug. 6, 2009

(30) Foreign Application Priority Data

Feb. 1, 2008 (JP) .................. 2008-022827

(51) Int. Cl.
*H01M 4/62* (2006.01)

(52) U.S. Cl. .................... 429/217; 429/231.95; 429/232

(58) Field of Classification Search .................. 429/217, 429/232, 231.95
See application file for complete search history.

(56) References Cited

U.S. PATENT DOCUMENTS

| 6,337,153 | B1 | 1/2002 | Kodama et al. | |
|---|---|---|---|---|
| 6,905,796 | B2 | 6/2005 | Ishida et al. | |
| 7,005,211 | B2 * | 2/2006 | Kim et al. | ............ 429/217 |
| 2007/0264575 | A1 | 11/2007 | Wakita et al. | |
| 2008/0118836 | A1 * | 5/2008 | Hwang et al. | ........ 429/232 X |

FOREIGN PATENT DOCUMENTS

| JP | 4-95363 | 3/1992 |
|---|---|---|
| JP | 10-255807 | 9/1998 |
| JP | 10-255842 | 9/1998 |
| JP | 11-097072 | 4/1999 |
| JP | 2001-126766 | 5/2001 |
| JP | 3223523 | 8/2001 |
| JP | 3371301 | 11/2002 |
| JP | 2007-305545 | 11/2007 |
| JP | 2008-41465 | 2/2008 |

* cited by examiner

*Primary Examiner* — Stephen J. Kalafut
(74) *Attorney, Agent, or Firm* — K&L Gates LLP

(57) ABSTRACT

A non-aqueous electrolyte battery includes a positive electrode, a negative electrode having a negative electrode active material layer provided on a negative electrode collector and a non-aqueous electrolyte, wherein the negative electrode active material layer contains a polyvinylidene fluoride-containing binder and a nano ceramic particle having a primary particle size of not more than 100 nm; and the binder and the nano ceramic particle are complexed.

10 Claims, 2 Drawing Sheets

NON-AQUEOUS ELECTROLYTE BATTERY AND NEGATIVE ELECTRODE, AND METHOD FOR MANUFACTURING THE SAME

CROSS REFERENCES TO RELATED APPLICATIONS

The present application claims priority to Japanese Patent Application JP 2008-022827 filed in the Japanese Patent Office on Feb. 1, 2008, the entire contents of which being incorporated herein by reference.

BACKGROUND

The present application relates to a non-aqueous electrolyte battery having enhanced input and output characteristics of a negative electrode and a negative electrode and to a method for manufacturing the same.

Among non-aqueous electrolyte batteries, a lithium ion secondary battery is rapidly developing as a power source of portable electronic devices such as a mobile phone and a personal computer. In the power source for such a portable electronic device, an energy density, namely an energy storage capacity per unit volume is the most necessary characteristic, and how long the portable electronic device can be used attracts interest. As to a negative electrode material of the lithium ion secondary battery, realization of a high density of the electrode using a carbon material of every sort has been developed. In all of the cases, it is aimed to enhance the energy density or cycle characteristics.

In the lithium ion secondary battery, when polyvinylidene fluoride with excellent lithium ion mobility is used as a negative electrode binder, input and output characteristics of the battery can be enhanced.

However, in discharging a more highly filled negative electrode at a larger current, there was involved a problem that since the lithium ion mobility in polyvinylidene fluoride is limited, polyvinylidene fluoride which covers the surface of a negative electrode active material impairs an interfacial reaction, and diffusion of lithium and electrochemical acceptance of lithium cannot keep up, whereby metallic lithium is easy to deposit on the negative electrode. In such a negative electrode, the metallic lithium deposited in the negative electrode is easily deactivated, resulting in an enormous lowering of cycle characteristics. Consequently, it has been difficult to increase the thickness of the active material layer or to increase the volume density.

Accordingly, for the purpose of obtaining a high-output battery, it is effective and important to reduce the ionic resistance in polyvinylidene fluoride.

As disclosed in JP-A-4-95363, when hexafluoropropylene is copolymerized with polyvinylidene fluoride, though the ionic resistance in the polyvinylidene fluoride can be reduced, the polyvinylidene fluoride itself is largely swollen in an electrolytic solution, and the electrode is swollen. Thus, favorable cycle characteristics cannot be secured.

Also, there is proposed a lithium ion secondary battery in which lithium diffusibility in a negative electrode is enhanced by mixing a ceramic particle in the negative electrode (see JP-A-10-255807). This intends to obtain a high-capacity lithium ion secondary battery by mixing a ceramic having high ionic conductivity in a negative electrode to enhance the diffusibility of a lithium ion, thereby reducing an internal resistance of the negative electrode. Also, it is possible to devise to enhance the strength of the electrode at the same time, and therefore, it becomes possible to enhance the cycle characteristics. It is described that it is possible to devise to enhance the battery performance by incorporating from 0.01 to 20 parts by weight of the ceramic based on 100 parts by weight of the negative electrode active material. At that time, a ceramic having a primary particle size of not more than 10 $\mu$m is used.

SUMMARY

Here, in the case of mixing a ceramic in a negative electrode, in a lithium ion battery using an electrolytic solution containing an organic solvent, when the primary particle size of the ceramic to be mixed is too large, there is a possibility that a diffusion effect of an ion is not obtainable. Inversely, there is also a possibility that diffusion of the ion is inhibited. Also, even when the ceramic is merely diffused into an electrode, electron conduction between active materials or conductive materials is inhibited, resulting in deterioration of cycle characteristics.

In general, in a lithium ion battery, polyvinylidene fluoride in the electrode exists in a state that it covers the surface of an active material and binds the active materials to each other in a string form, and its thickness is from several nanometers to several ten nanometers. For that reason, in the case of mixing a ceramic having a large primary particle size, the ceramic surface opposing to an electrolytic solution becomes large. Since the ion diffusibility of the ceramic surface is lower than that of the electrolytic solution, when the primary particle size of the ceramic is too large, there is a possibility that the diffusion of the ion is inhibited. Also, the ceramic surface area which contributes to the ion diffusion in polyvinylidene fluoride decreases, and an effect for enhancing the ion diffusibility on the surface of a negative electrode active material becomes small. As a result, it becomes difficult to control the deposition of lithium. In other words, even when the ceramic is merely dispersed into the electrode, electron conduction is inhibited. Thus, a form in which a ceramic is contained in polyvinylidene fluoride in an electrode is important.

In view of the foregoing problems, it is desirable to provide a non-aqueous electrolyte battery having high input and output and excellent cycle characteristics and also a negative electrode.

Specifically, according to an embodiment, there are provided the following non-aqueous electrolyte battery and negative electrode and method for manufacturing the same.

[1] A non-aqueous electrolyte battery including a positive electrode, a negative electrode having a negative electrode active material layer provided on a negative electrode collector and a non-aqueous electrolyte, wherein the negative electrode active material layer contains a polyvinylidene fluoride-containing binder and a nano ceramic particle having a primary particle size of not more than 100 nm; and the binder and the nano ceramic particle are complexed.

[2] A method for manufacturing a non-aqueous electrolyte battery including a non-aqueous electrolyte as well as a positive electrode and a negative electrode, which includes the steps of:

(1) mixing a polyvinylidene fluoride-containing binder, a nano ceramic particle having a primary particle size of not more than 100 nm and a solvent and thereafter, further adding and mixing a negative electrode active material to prepare a negative electrode mixture coating solution; and (2) coating the negative electrode mixture coating solution on a negative electrode collector and drying it to manufacture a negative electrode.

[3] A negative electrode including a negative electrode active material layer provided on a negative electrode collector, wherein the negative electrode active material layer contains a polyvinylidene fluoride-containing binder and a nano ceramic particle having a primary particle size of not more than 100 nm; and the binder and the nano ceramic particle are complexed.

[4] A method for manufacturing a negative electrode including the steps of:

(1) mixing a polyvinylidene fluoride-containing binder, a nano ceramic particle having a primary particle size of not more than 100 nm and a solvent and thereafter, further adding and mixing a negative electrode active material to prepare a negative electrode mixture coating solution; and (2) coating the negative electrode mixture coating solution on a negative electrode collector and drying it.

According to an embodiment, by complexing the binder and the nano ceramic particle in the negative electrode active material layer, the mobility of a lithium ion in the vicinity of the surface of the ceramic particle dispersed in the binder becomes high, and even when a large current is flown, the mobility of a lithium ion can be kept without lowering the movement of lithium within the negative electrode. Accordingly, even in a highly filled negative electrode, not only a high input and output density can be obtained, but excellent cycle characteristics can be obtained. Also, by incorporating the ceramic particle having a primary particle size of not more than 100 nm, higher effects are obtainable.

Additional features and advantages are described herein, and will be apparent from the following Detailed Description and the figures.

DETAILED DESCRIPTION

An embodiment of the present application is described in detail below with reference to the accompanying drawings.

Figure 1:
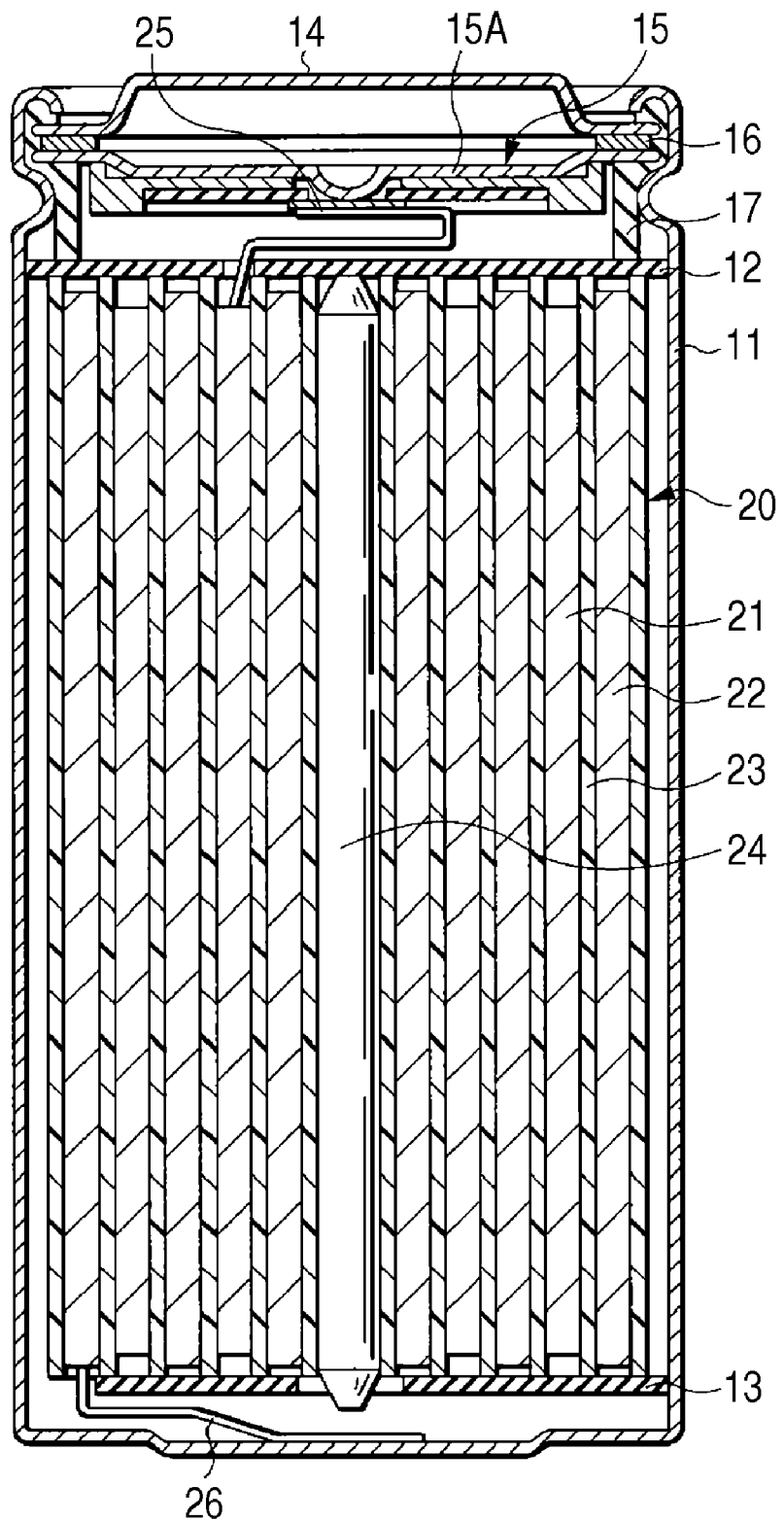
FIG. 1 is a cross-sectional view showing a configuration of a secondary battery according to an embodiment.

FIG. 1 shows a cross-sectional structure of a secondary battery according to an embodiment. This secondary battery is of a so-called cylinder type and has a wound electrode body 20 in which strip-shaped positive electrode 21 and negative electrode 22 are wound via a separator 23 in the interior of a battery can 11 in a substantially hollow column shape. The battery can 11 is constituted of, for example, iron (Fe) plated with nickel (Ni). One end of the battery can 11 is closed, with the other end being opened. A pair of insulating plates 12 and 13 is respectively disposed perpendicular to the winding peripheral face in the interior of the battery can 11 so as to interpose the wound electrode body 20 therebetween.

In the open end of the battery can 11, a battery cover 14 and a safety valve mechanism 15 and a positive temperature coefficient (PTC) device 16 provided inside this battery cover 14 are installed upon being caulked via a gasket 17, and the interior of the battery can 11 is hermetically sealed. The battery cover 14 is constituted of, for example, a material the same as in the battery can 11. The safety valve mechanism 15 is electrically connected to the battery cover 14 via the positive temperature coefficient device 16. When an internal pressure of the battery reaches a certain level or more due to an internal short circuit, heating from the exterior or the like, a disk plate 15A is reversed, thereby cutting electrical connection between the battery cover 14 and the wound electrode body 20. When the temperature rises, the positive temperature coefficient device 16 limits a current due to an increase in a resistance value, thereby preventing abnormal heat generation due to a large current from occurring. The gasket 17 is constituted of, for example, an insulating material, and its surface is coated with asphalt.

For example, a center pin 24 is inserted in the center of the wound electrode body 20. A positive electrode lead 25 made of aluminum (Al) or the like is connected to the positive electrode 21 of the wound electrode body 20; and a negative electrode lead 26 made of nickel or the like is connected to the negative electrode 22 of the wound electrode body 20. The positive electrode lead 25 is electrically connected to the battery cover 14 upon being welded with the safety valve mechanism 15; and the negative electrode lead 26 is welded with and electrically connected to the battery can 11.

(Positive Electrode)

Figure 2:
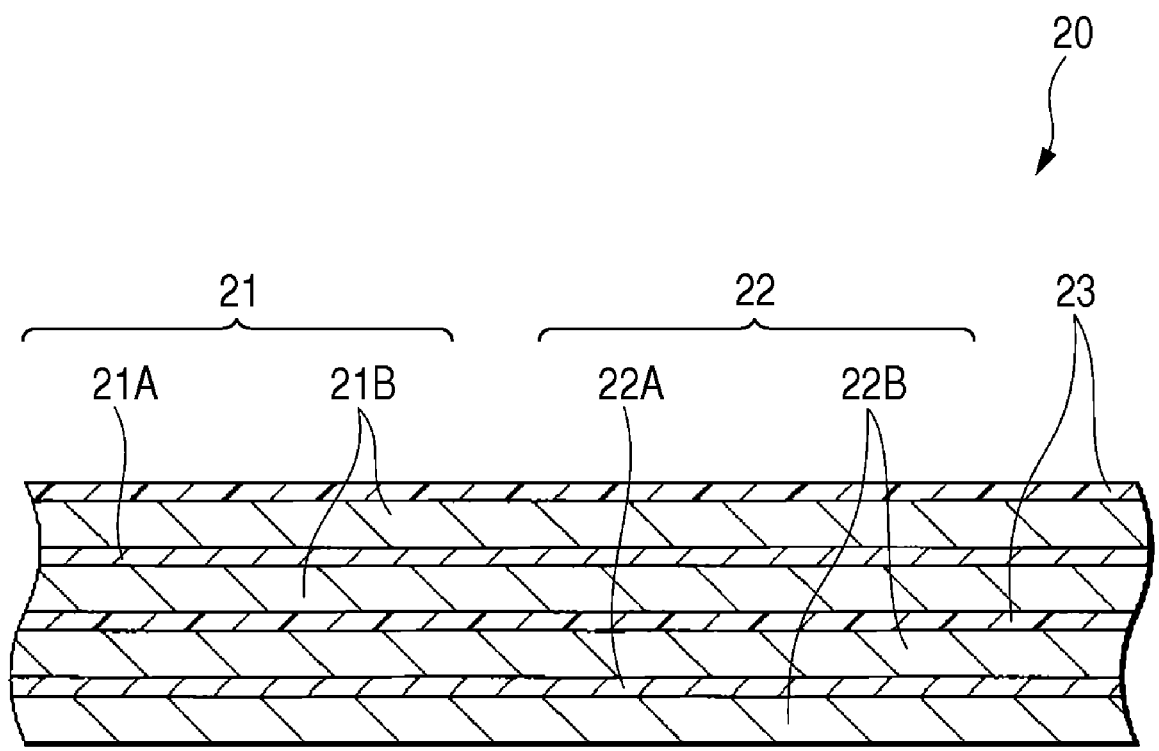
FIG. 2 is a cross-sectional view showing an enlarged part of a wound electrode body in the secondary battery as shown in FIG. 1.

FIG. 2 shows an enlarged part of the wound electrode body 20 as shown in FIG. 1. The positive electrode 21 has a structure in which, for example, a positive electrode active material layer 21B is provided on the both faces of a positive electrode collector 21A having a pair of faces opposing to each other. Though illustration is omitted, the positive electrode active material layer 21B may be provided on only one face of the positive electrode collector 21A. The positive electrode collector 21A is constituted of, for example, a metal foil such as an aluminum foil, a nickel foil and a stainless steel foil.

The positive electrode active material layer 21B is constituted so as to contain, as a positive electrode active material, for example, one or two or more kinds of a positive electrode material capable of occluding and releasing lithium as an electrode reactant. Examples of the positive electrode material capable of occluding and releasing lithium include lithium-containing compounds such as a lithium oxide, a lithium sulfide, an intercalation compound containing lithium and a lithium phosphate compound. Of these, a complex oxide containing lithium and a transition metal element or a phosphate compound containing lithium and a transition metal element is preferable; and a compound containing at least one of cobalt (Co), nickel, manganese (Mn), iron, aluminum, vanadium (V) and titanium (Ti) as a transition metal element is especially preferable. A chemical formula thereof is expressed by, for example, $Li_xM1O_2$ or $Li_yM2PO_4$. In the formulae, M1 and M2 each includes at least one transition metal element; and values of x and y vary depending upon the charge and discharge state of the battery and are usually satisfied with the relationships of ($0.05 \leq x \leq 1.10$) and ($0.05 \leq y \leq 1.10$).

Specific examples of the complex oxide containing lithium and a transition metal element include a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ ($z<1$)), a lithium nickel cobalt manganese complex oxide ($Li_xNi_{(1-v-w)}Co_vMn_wO_2$ ($v+w<1$)) and a lithium manganese complex oxide having a spinel structure ($LiMn_2O_4$). Specific examples of the phosphate compound containing lithium and a transition metal element include a lithium iron phosphate compound ($LiFePO_4$) and a lithium iron manganese phosphate compound ($LiFe_{1-u}Mn_uPO_4$ ($u<1$)).

As the positive electrode material capable of occluding and releasing lithium, other metal compound and a polymer material can also be exemplified. Examples of other metal compound include oxides such as titanium oxide, vanadium oxide and manganese dioxide; and disulfides such as titanium sulfide and molybdenum sulfide. Examples of the polymer material include polyaniline and polythiophene.

The positive electrode active material layer 21B may contain a conductive material or a binder as the need arises. Examples of the conductive material include carbon materials such as graphite, carbon black and ketjen black. These materials are used singly or in admixture of two or more kinds thereof. Also, besides the carbon material, a metal material, a conductive polymer material or the like may be used so far as the material is a conductive material. Examples of the binder include synthetic rubbers such as styrene-butadiene based rubber, fluorocarbon based rubber and ethylene-propylene-diene rubber; and polymer materials such as polyvinylidene fluoride. These materials are used singly or in admixture of two or more kinds thereof.

(Negative Electrode)

The negative electrode 22 has, for example, a configuration in which a negative electrode active material layer 22B is provided on the both faces of a negative electrode collector 22A having a pair of faces opposing to each other. Though illustration is omitted, the negative electrode active material layer 22B may be provided on only one face of the negative electrode collector 22A. The negative electrode collector 22A is constituted of, for example, a metal foil such as a copper foil, a nickel foil and a stainless steel foil.

The negative electrode active material layer 22B contains a polyvinylidene fluoride-containing binder and a nano ceramic particle having a primary particle size of not more than 100 nm. Furthermore, it is preferable that the negative electrode active material layer 22B contains, as a negative electrode active material, one or two or more kinds of a negative electrode material capable of occluding and releasing lithium as an electrode reactant. Also, the negative electrode active material layer 22B may contain a conductive agent as the need arises.

It is essential that the nano ceramic particle has a primary particle size of not more than 100 nm. When the primary particle size exceeds 100 nm, a non-aqueous electrolyte secondary battery having a high input and output density and excellent cycle characteristics is not obtainable. Also, from the viewpoint of obtaining a higher input and output density and more excellent cycle characteristics, the primary particle size is preferably not more than 20 nm. When the particle is smaller, a higher effect is obtainable. A lower limit value of the primary particle size is not particularly restricted.

It is essential that the binder contains at least polyvinylidene fluoride. The binder may further contain polyacrylonitrile, a rubber based binder or the like.

In an embodiment according to the present application, the binder and the ceramic particle in the negative electrode active material layer are complexed. The term "complexed" as referred to herein means that the binder and the nano ceramic particle come into contact with each other. Due to this complexation, the mobility of a lithium ion in the vicinity of the surface of the ceramic particle dispersed in the binder becomes high, and even when a large current is flown, the mobility of a lithium ion can be kept without lowering the movement of lithium within the negative electrode. Accordingly, even in a highly filled negative electrode, not only a high input and output density can be obtained, but excellent cycle characteristics can be obtained. The complexed state can be observed by, for example, a scanning electron microscope (SEM).

As such a ceramic, for example, an inorganic oxide is useful. Specifically, an inorganic oxide which does not participate in a charge and discharge reaction, for example, aluminum oxide ($Al_2O_3$), silicon oxide ($SiO_2$), zirconium oxide ($ZrO_2$), magnesium oxide (MgO), sodium oxide ($Na_2O$) and titanium oxide ($TiO_2$) can be favorably used. $Al_2O_3$ can be more favorably used because lithium ion diffusibility of the surface of the $Al_2O_3$ particle is especially excellent. Also, a mixed inorganic oxide according to an arbitrary combination thereof or a complex inorganic oxide or the like can be used.

Also, the content of the nano ceramic particle is preferably from 1 to 50 parts by mass, and more preferably from 5 to 30 parts by mass based on 100 parts by mass of the binder. When the content of the nano ceramic particle falls within the foregoing range, it is possible to produce a non-aqueous electrolyte secondary battery having a high input and output density and excellent cycle characteristics.

Examples of the negative electrode material capable of occluding and releasing lithium include carbon materials such as graphite, hardly graphitized carbon and easily graphitized carbon. Such a carbon material is preferable because a change in the crystal structure to be generated at the time of charge and discharge is very little, a high charge and discharge capacity can be obtained, and favorable charge and discharge cycle characteristics can be obtained. The graphite may be any of natural graphite and artificial graphite.

As the hardly graphitized carbon, for example, one which has a lattice spacing of the (002) plane of 0.37 nm or more and a true density of less than $1.70 \, g/cm^3$ and which does not show an exothermic peak at 700° C. or higher in differential thermal analysis (DTA) in air is preferable.

As the negative electrode material capable of occluding and releasing lithium, a single body, an alloy or a compound of a metal element or a semi-metal element capable of forming an alloy with lithium is also exemplified. Such a material may be contained. These are preferable because a high energy density is obtainable. In particular, a combined use of such a material together with a carbon material is more preferable because not only a high energy density is obtainable, but excellent charge and discharge cycle characteristics are obtainable. In this specification, the alloy includes alloys containing at least one metal element and at least one semi-metal element in addition to alloys composed of two or more metal elements. Examples of its texture include a solid solution, a eutectic (eutectic mixture), an intermetallic compound and one in which two or more thereof coexist.

Examples of the metal element or semi-metal element capable of forming an alloy together with lithium include tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of such an alloy or compound include those represented by a chemical formula: $Ma_sMb_t$. In this chemical formula, Ma represents at least one member of metal elements and semi-metal elements capable of forming an alloy together with lithium; and Mb represents at least one member of metal elements and semi-metal elements other than Ma. Also, the values of s and t are $s>0$ and $t \geq 0$, respectively.

Above all, a single body, an alloy or a compound of a metal element or a semi-metal element belonging to the Group 14 of the long form of the periodic table is preferable; and silicon or tin or an alloy or a compound thereof is especially preferable. These materials may be crystalline or amorphous.

Specific examples of such an alloy or compound include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v \leq 2$), $SnO_w$ ($0<w \leq 2$), $SnSiO_3$, LiSiO and LiSnO.

(Separator)

The separator 23 isolates the positive electrode 21 and the negative electrode 22 from each other, prevents a short circuit of current to be caused due to contact of the both electrodes from occurring and passes a lithium ion therethrough. The separator 23 is constituted of, for example, a porous membrane made of a synthetic resin such as polytetrafluoroethylene, polypropylene and polyethylene or a porous membrane made of a ceramic. The separator 23 may also have a porous membrane structure in which two or more kinds of the foregoing porous membranes are laminated. Above all, a polyolefin-made porous membrane is preferable because it is excellent in an effect for preventing a short circuit from occurring and is able to devise to enhance safety of the battery due to a shutdown effect. In particular, polyethylene is preferable as a material which constitutes the separator 23 because it is able to obtain a shutdown effect within a temperature range of 100° C. or higher and not higher than 160° C. and is excellent in electrochemical stability. Also, polypropylene is preferable. Besides, a resin may be used upon being copolymerized or blended with polyethylene or polypropylene so far as it has chemical stability.

(Non-Aqueous Electrolyte)

An electrolytic solution is impregnated as a non-aqueous electrolyte in the separator 23. The electrolytic solution contains, for example, a solvent and an electrolyte salt.

Examples of the solvent include ambient temperature molten salts such as 4-fluoro-1,3-dioxolan-2-one, ethylene carbonate, propylene carbonate, butylene carbonate, vinylene carbonate, dimethyl carbonate, diethyl carbonate, ethyl methyl carbonate, γ-butyrolactone, γ-valerolactone, 1,2-dimethoxyethane, tetrahydrofuran, 2-methyltetrahydrofuran, 1,3-dioxolan, 4-methyl-1,3-dioxolan, methyl acetate, methyl propionate, ethyl propionate, acetonitrile, glutaronitrile, adiponitrile, methoxyacetonitrile, 3-methoxypropyronitrile, N,N-dimethylformamide, N-methylpyrrolidinone, N-methyloxazolidinone, nitromethane, nitroethane, sulfolane, dimethyl sulfoxide, trimethyl phosphate, triethyl phosphate, ethylene sulfite and bistrifluoromethylsulfonylimidotrimethylhexyl ammonium. Above all, when at least one member selected from the group consisting of 4-fluoro-1,3-dioxolan-2-one, ethylene carbonate, propylene carbonate, vinylene carbonate, dimethyl carbonate, ethyl methyl carbonate and ethylene sulfite is mixed and used, excellent charge and discharge capacity characteristics and charge and discharge cycle characteristics can be obtained, and therefore, such is preferable.

As the electrolyte salt, a single material or a mixture of two or more kinds of materials may be contained. Examples of the electrolyte salt include lithium hexafluorophosphate ($LiPF_6$), lithium bis(pentafluoroethanesulfonyl)imide ($Li(C_2F_5SO_2)_2N$), lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), lithium bis(trifluoromethanesulfonyl)imide ($Li(CF_3SO_2)_2N$), methyl lithium tris(trifluoromethanesulfonyl) ($LiC(SO_2CF_3)_3$), lithium chloride (LiCl) and lithium bromide (LiBr).

(Manufacturing Method)

This secondary battery can be, for example, manufactured in the following manner.

First of all, for example, a positive electrode active material, a conductive material and a binder are mixed to prepare a positive electrode mixture. This positive electrode mixture is dispersed in a solvent such as N-methyl-2-pyrrolidone to form a positive electrode mixture coating solution in a pasty positive electrode mixture slurry. Subsequently, this positive electrode mixture coating solution is coated on the positive electrode collector 21A, and the solvent is then dried. Thereafter, the resultant is compression molded by a rolling press machine or the like to form the positive electrode active material layer 21B. There is thus prepared the positive electrode 21. The positive electrode active material layer 21B may also be formed by sticking the positive electrode mixture onto the positive electrode collector 21A.

Also, as to the negative electrode, a binder and a nano ceramic particle are dispersed in a solvent such as N-methyl-2-pyrrolidone. There is thus formed a complex of the binder and the nano ceramic particle. Next, this mixed solution is mixed with a carbon material as a negative electrode active material and a conductive agent to prepare a negative electrode mixture coating solution in a pasty negative electrode mixture slurry. Subsequently, this negative electrode mixture coating solution is coated on the negative electrode collector 22A, and the solvent is then dried. Thereafter, the resultant is compression molded by a rolling press machine or the like to form the negative electrode active material layer 22B. There is thus prepared the negative electrode 22. The negative electrode active material layer 22B may also be formed by sticking the negative electrode mixture onto the negative electrode collector 22A.

Next, the positive electrode lead 25 is installed in the positive electrode collector 21A by means of welding or the like, and the negative electrode lead 26 is also installed in the negative electrode collector 22A by means of welding or the like. Thereafter, the positive electrode 21 and the negative electrode 22 are wound via the separator 23; a tip end of the positive electrode lead 25 is welded with the safety valve mechanism 15; and a tip end of the negative electrode lead 26 is welded with the battery can 11. The wound positive electrode 21 and negative electrode 22 are interposed between a pair of the insulating plates 12 and 13 and contained in the interior of the battery can 11. After the positive electrode 21 and the negative electrode 22 are contained in the interior of the battery can 11, an electrolytic solution is injected into the interior of the battery can 11 and impregnated in the separator 23. Thereafter, the battery cover 14, the safety valve mechanism 15 and the positive temperature coefficient device 16 are fixed to the open end of the battery can 11 upon being caulked via the gasket 17. There is thus completed the secondary battery as shown in FIG. 1.

In this secondary battery, when charged, for example, a lithium ion is released from the positive electrode active material layer 21B and occluded in the negative electrode active material layer 22B via the electrolytic solution. Also, when discharged, for example, a lithium ion is released from the negative electrode active material layer 22B and occluded in the positive electrode active material layer 21B via the electrolytic solution. On that occasion, in this embodiment, since the ceramic particle of not more than 100 nm is contained in the negative electrode binder, the mobility of a lithium ion in the vicinity of the surface of the nano ceramic particle dispersed in the binder becomes high, and even when a large current is flown through the negative electrode 22, the diffusion of lithium and electrochemical input and output characteristics in the negative electrode 22 are enhanced.

While the present application has been described with reference to the foregoing embodiment, it should not be construed that the present application is limited to the foregoing embodiment, and various modifications may be made. All of structures in which a nano ceramic particle is complexed in the binder of the negative electrode are corresponding thereto.

Also, in the foregoing embodiment, the secondary battery of a cylinder type having a winding structure has been specifically described. However, the present application is similarly applicable to a secondary battery of an oval type or a polygonal type having a winding structure, or a secondary battery having other structure in which a positive electrode and a negative electrode are folded, or plural positive electrodes and negative electrodes are laminated. In addition, the present application is similarly applicable to secondary batteries having other shape such as a coin type, a button type, a square type and a laminated film type.

Moreover, in the foregoing embodiment, the case of using a liquid electrolytic solution as an electrolyte has been described. However, an electrolyte in a gel form in which an electrolytic solution is held in a holding body such as a polymer compound may be used. Examples of such a polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene and polycarbonate. In particular, polyacrylonitrile, polyvinylidene fluoride, polyhexafluoropropylene and polyethylene oxide are preferable in view of electrochemical stability. A proportion of the polymer compound to the electrolytic solution varies with compatibility therebetween. In general, it is preferable to add the polymer compound in an amount corresponding to 5% by mass or more and not more than 50% by mass of the electrolytic solution.

EXAMPLES

An embodiment is specifically described below in detail with reference to the following Examples.

Examples 1-1 to 1-12 and Comparative Example 1-1

The secondary battery of a cylinder type as shown in FIGS. 1 and 2 was prepared.

Lithium cobaltate ($LiCoO_2$) having an accumulated 50% particle size (median particle size) obtained by a laser diffraction method of 12 μm was used as a positive electrode material. Subsequently, 95% by mass of this lithium cobalt complex oxide powder and 5% by mass of a lithium carbonate ($Li_2CO_3$) powder were mixed; 96% by mass of this mixture, 1% by mass of ketjen black as a conductive material and 3% by mass of polyvinylidene fluoride as a binder were mixed; and the resulting mixture was dispersed in N-methyl-2-pyrrolidone as a solvent to form a positive electrode mixture coating solution. Next, this positive electrode mixture coating solution was uniformly coated on the both faces of the positive electrode collector 21A made of a strip-shaped aluminum foil having a thickness of 20 μm and then dried. The resultant was compression molded to form the positive electrode active material layer 21B, thereby preparing the positive electrode 21. On that occasion, a thickness of one face of the positive electrode active material layer 21B was 70 μm, and a volume density thereof was 3.62 g/cm³. Thereafter, the positive electrode lead 25 made of aluminum was installed in one end of the positive electrode collector 21A.

Also, as to a negative electrode, 3.0% by mass of polyvinylidene fluoride and an alumina particle having a primary average particle size of 50 nm were well dispersed in N-methyl-2-pyrrolidone. The mixed solution in which a complex of polyvinylidene fluoride and the alumina particle had been formed was mixed with 97% by mass of a granular graphite powder composed of a mesophase spherical particle having a lattice spacing $d_{002}$ in the C-axis direction calculated in the X-ray diffraction of 0.336 nm and a median particle size of 20 μm to prepare a negative electrode mixture. There was thus formed a negative electrode mixture coating solution. In Examples 1-1 to 1-12 and Comparative Example 1-1, the mixing amounts of the alumina particle relative to polyvinylidene fluoride were varied.

Next, this negative electrode mixture coating solution was uniformly coated on the both faces of the negative electrode collector 22A made of a strip-shaped copper foil having a thickness of 16 μm and then dried. The resultant was compression molded to form the negative electrode active material layer 22B, thereby preparing the negative electrode 22. On that occasion, a thickness of one face of the negative electrode active material layer 22B was 61 μm, and a volume density thereof was 1.80 g/cm³. Subsequently, the negative electrode lead 26 made of nickel was installed in one end of the negative electrode collector 22A in three spots.

After the positive electrode 21 and the negative electrode 22 were respectively formed, the positive electrode 21 and the negative electrode 22 were laminated via the separator 23 made of a microporous polyethylene stretched film having a thickness of 18 μm in the order of the negative electrode 22, the separator 23, the positive electrode 21 and the separator 23. The resulting laminate was wound many times, thereby preparing the wound electrode body 20 of a jelly roll type. Next, the wound electrode body 20 was interposed between a pair of the insulating plates 12 and 13; not only the negative electrode lead 26 was welded with the battery can 11, but the positive electrode lead 25 was welded with the safety valve mechanism 15; and the wound electrode body 20 was then contained in the interior of the battery can 11. Subsequently, an electrolytic solution was injected into the interior of the battery can 11, and the battery cover 14 was caulked with the battery can 11 via the gasket 17, thereby preparing a secondary battery of a cylinder type.

On that occasion, a solution prepared by dissolving, as an electrolyte salt, lithium hexafluorophosphate in a proportion of 1.28 moles/kg in a mixed solvent of ethylene carbonate (EC), dimethyl carbonate (DMC) and propylene carbonate (PC) in a proportion of 20/70/10 was used as the electrolytic solution.

(Measurement of Capacity Maintenance Ratio)

Each of the lithium ion secondary batteries prepared in Examples 1-1 to 1-12 and Comparative Example 1-1 was subjected to charge and discharge and examined with respect to a capacity maintenance ratio after 100 cycles. First of all, charge was performed at a constant current of 1 C until a battery voltage reached 4.2 V. Thereafter, charge was performed while being switched to a constant voltage of 4.2 V and then finished at a point of time when a total charge time reached 4 hours. Next, discharge was performed at a constant current of 1 C and then finished at a point of time when a battery voltage reached 3.0 V, and a discharge capacity at the first cycle was measured.

Subsequently, in each of the Examples and Comparative Example, a charge and discharge cycle in which charge was performed until a battery voltage reached 4.2 V, and discharge was performed until the battery voltage reached 3.0 V was repeated 100 cycles. A battery capacity at the 100th cycle was measured, and a capacity maintenance ratio after 100 cycles was determined according to [{(battery capacity at the 100th cycle)/(battery capacity at the first cycle)}×100(%)].

Example 1-13

A secondary battery was prepared in the same manner as in Example 1-5, except that in preparing a negative electrode mixture, polyvinylidene fluoride, the alumina particle and the granular graphite powder were simultaneously mixed in N-methyl-pyrrolidone and dispersed to form a negative electrode mixture coating solution.

Example 1-14 to 1-26

A secondary battery was prepared in the same manner as in Example 1-1 to 1-13, except alumina particles having diameter of 15 nm were used.

The capacity maintenance ratio after 100 cycles in each of the Examples and Comparative Examples is shown in the following Table 1.

TABLE 1

| | Nano ceramic particle | | Capacity maintenance |
|---|---|---|---|
| | Material | Primary particle size (nm) | Part by mass | ratio after 100 cycles (%) |
| Example 1-1 | $Al_2O_3$ | 50 | 0.05 | 71 |
| Example 1-2 | $Al_2O_3$ | 50 | 0.1 | 79 |
| Example 1-3 | $Al_2O_3$ | 50 | 1 | 80 |
| Example 1-4 | $Al_2O_3$ | 50 | 5 | 81 |
| Example 1-5 | $Al_2O_3$ | 50 | 10 | 85 |
| Example 1-6 | $Al_2O_3$ | 50 | 20 | 86 |
| Example 1-7 | $Al_2O_3$ | 50 | 30 | 88 |
| Example 1-8 | $Al_2O_3$ | 50 | 40 | 80 |
| Example 1-9 | $Al_2O_3$ | 50 | 50 | 80 |
| Example 1-10 | $Al_2O_3$ | 50 | 60 | 72 |
| Example 1-11 | $Al_2O_3$ | 50 | 80 | 71 |
| Example 1-12 | $Al_2O_3$ | 50 | 100 | 67 |
| Example 1-13 | $Al_2O_3$ | 50 | 10 | 69 |
| Example 1-14 | $Al_2O_3$ | 15 | 0.05 | 73 |
| Example 1-15 | $Al_2O_3$ | 15 | 0.1 | 81 |
| Example 1-16 | $Al_2O_3$ | 15 | 1 | 83 |
| Example 1-17 | $Al_2O_3$ | 15 | 5 | 85 |
| Example 1-18 | $Al_2O_3$ | 15 | 10 | 88 |
| Example 1-19 | $Al_2O_3$ | 15 | 20 | 90 |
| Example 1-20 | $Al_2O_3$ | 15 | 30 | 90 |
| Example 1-21 | $Al_2O_3$ | 15 | 40 | 83 |
| Example 1-22 | $Al_2O_3$ | 15 | 50 | 80 |
| Example 1-23 | $Al_2O_3$ | 15 | 60 | 76 |
| Example 1-24 | $Al_2O_3$ | 15 | 80 | 74 |
| Example 1-25 | $Al_2O_3$ | 15 | 100 | 70 |
| Example 1-26 | $Al_2O_3$ | 15 | 10 | 72 |
| Comparative Example 1-1 | $Al_2O_3$ | 50 | 0 | 56 |

As shown in Table 1, in Examples 1-1 to 1-26, the cycle characteristics were enormously enhanced as compared with Comparative Example 1-1 in which alumina was not added as the nano ceramic particle. Also, it was noted that the optimal addition amount of the nano ceramic particle at which the effect can be revealed is from 0.1 to 50 parts by mass based on 100 parts by mass of the binder.

Also, in Example 1-5 in which in preparing a negative electrode mixture, polyvinylidene fluoride and the alumina particle were mixed in N-methyl-2-pyrrolidone and then mixed with the graphite powder, the capacity maintenance ratio after 100 cycles was enhanced as compared with Comparative Example 1-2 in which polyvinylidene fluoride, the alumina particle and the granular graphite powder were simultaneously mixed in N-methyl-2-pyrrolidone. It may be considered that this was caused due to the matter that by previously mixing the binder and the nano ceramic particle in the solvent, a complex of the binder and the nano ceramic particle was easily formed.

The capacity maintenance ratio after 100 cycles was little enhanced with Examples 1-13 and 1-26. It may be considered because the complexes of the binder and the nano ceramic particles are less formed. In these examples, lone, i.e, not complexed particles can frequently be observed by means of SEM.

Examples 2-1 to 2-5 and Comparative Examples 2-1 to 2-4

In Examples 2-1 to 2-5 and Comparative Examples 2-1 to 2-4, secondary batteries of a cylinder type were prepared in the same manner as in Example 1-6, except for changing the primary particle size of the alumina particle.

The capacity maintenance ratio after 100 cycles in each of the Examples and Comparative Examples is shown in the following Table 2.

TABLE 2

| | Nano ceramic particle | | | Capacity maintenance |
|---|---|---|---|---|
| | Material | Primary particle size (nm) | Part by mass | ratio after 100 cycles (%) |
| Example 2-1 | $Al_2O_3$ | 8 | 20 | 94 |
| Example 2-2 | $Al_2O_3$ | 15 | 20 | 90 |
| Example 2-3 | $Al_2O_3$ | 20 | 20 | 90 |
| Example 1-6 | $Al_2O_3$ | 50 | 20 | 86 |
| Example 2-4 | $Al_2O_3$ | 82 | 20 | 74 |
| Example 2-5 | $Al_2O_3$ | 100 | 20 | 65 |
| Comparative Example 2-1 | $Al_2O_3$ | 110 | 20 | 57 |
| Comparative Example 2-2 | $Al_2O_3$ | 300 | 20 | 43 |
| Comparative Example 2-3 | $Al_2O_3$ | 700 | 20 | 34 |
| Comparative Example 2-4 | $Al_2O_3$ | 1500 | 20 | 15 |

In Examples 2-1 to 2-5, it could be confirmed that a favorable enhancement in cycle characteristics was revealed by the addition of alumina. On the other hand, in Comparative Examples 2-1 to 2-4, it may be considered that since the primary particle size of the alumina particle is large and largely exceeds the thickness of polyvinylidene fluoride, a favorable polyvinylidene fluoride/nano ceramic particle complex was not formed. Also, it may be considered to be caused due to the matter that since large alumina particles as an insulator existed between the active material particles, a lowering of electrical conduction was generated, whereby a drastic enhancement in loading characteristics was not obtained. It was noted from the foregoing that the optimal primary particle size of the nano ceramic particle is not more than 100 nm.

Examples 3-1 to 3-5

Secondary batteries of a cylinder type were prepared in the same manner as in Example 1-6, except for changing the kind of the material of the nano ceramic particle.

The capacity maintenance ratio after 100 cycles in each of the Examples is shown in the following Table 3.

TABLE 3

| | Nano ceramic particle | | | Capacity maintenance |
|---|---|---|---|---|
| | Material | Primary particle size (nm) | Part by mass | ratio after 100 cycles (%) |
| Example 3-1 | $SiO_2$ | 50 | 20 | 88 |
| Example 3-2 | $ZrO_2$ | 50 | 20 | 88 |
| Example 3-3 | MgO | 50 | 20 | 79 |

TABLE 3-continued

|  | Nano ceramic particle | | | Capacity maintenance |
|---|---|---|---|---|
|  | Material | Primary particle size (nm) | Part by mass | ratio after 100 cycles (%) |
| Example 3-4 | $Na_2O$ | 50 | 20 | 78 |
| Example 3-5 | $TiO_2$ | 50 | 20 | 82 |
| Example 1-6 | $Al_2O_3$ | 50 | 20 | 86 |

From the results of Table 3, a drastic enhancement in cycle characteristics was found in all of $SiO_2$, $ZrO_2$, MgO, $Na_2O$ and $TiO_2$.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte battery comprising:
a positive electrode;
a negative electrode having a negative electrode active material layer provided on a negative electrode collector; and
a non-aqueous electrolyte, wherein
the negative electrode active material layer contains a carbon material with a true density of less than 1.70 g/cm³, an alloy or compound of a metal element or semi-metal element capable of forming an alloy with lithium, a polyvinylidene fluoride-containing binder and a nano ceramic particle having a primary particle size of not more than 100 nm; and
the binder and the nano ceramic particle are complexed.

2. The non-aqueous electrolyte battery according to claim 1, wherein the nano ceramic particle is at least one member selected from the group consisting of $Al_2O_3$, $SiO_2$, $ZrO_2$, MgO, $TiO_2$ and $Na_2O$.

3. The non-aqueous electrolyte battery according to claim 1, wherein the content of the nano ceramic particle is from 1 to 50 parts by mass based on 100 parts by mass of the binder.

4. The non-aqueous electrolyte battery according to claim 1, wherein the nano ceramic particle has a primary particle size of not more than 20 nm.

5. A method for manufacturing a non-aqueous electrolyte battery including a non-aqueous electrolyte as well as a positive electrode and a negative electrode, which comprises the steps of:

(1) mixing a polyvinylidene fluoride-containing binder, a nano ceramic particle having a primary particle size of not more than 100 nm and a solvent and thereafter, further adding and mixing a negative electrode active material including a carbon material with a true density of less than 1.70 g/cm³, and an alloy or compound of a metal element or semi-metal element capable of forming an alloy with lithium to prepare a negative electrode mixture coating solution; and
(2) coating the negative electrode mixture coating solution on a negative electrode collector and drying it to manufacture a negative electrode.

6. A negative electrode comprising a negative electrode active material layer provided on a negative electrode collector, wherein
the negative electrode active material contains a carbon material with a true density of less than 1.70 g/cm³, an alloy or compound of a metal element or semi-metal element capable of forming an alloy with lithium, a polyvinylidene fluoride-containing binder and a nano ceramic particle having a primary particle size of not more than 100 nm; and
the binder and the nano ceramic particle are complexed.

7. The negative electrode according to claim 6, wherein the nano ceramic particle is at least one member selected from the group consisting of $Al_2O_3$, $SiO_2$, $ZrO_2$, MgO, $TiO_2$ and $Na_2O$.

8. The negative electrode according to claim 6, wherein the content of the nano ceramic particle is from 1 to 50 parts by mass based on 100 parts by mass of the binder.

9. The negative electrode according to claim 6, wherein the nano ceramic particle has a primary particle size of not more than 20 nm.

10. A method for manufacturing a negative electrode comprising the steps of:

(1) mixing a polyvinylidene fluoride-containing binder, a nano ceramic particle having a primary particle size of not more than 100 nm and a solvent and thereafter, further adding and mixing a negative electrode active material including a carbon material with a true density of less than 1.70 g/cm³, an alloy or compound of a metal element or semi-metal element capable of forming an alloy with lithium to prepare a negative electrode mixture coating solution; and
(2) coating the negative electrode mixture coating solution on a negative electrode collector and drying it.

* * * * *